(12) United States Patent
Kim et al.

(10) Patent No.: US 8,906,976 B2
(45) Date of Patent: Dec. 9, 2014

(54) POLYURETHANE COMPOSITIONS FOR AN AUTOMOTIVE SEAT

(75) Inventors: Seok Hwan Kim, Gyeonggi-do (KR); Jeong Seok Oh, Gyeonggi-do (KR); Hyung-Won Jeon, Daejeon (KR); Sang Ho Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 404 days.

(21) Appl. No.: 13/370,445

(22) Filed: Feb. 10, 2012

(65) Prior Publication Data

US 2013/0109775 A1    May 2, 2013

(30) Foreign Application Priority Data

Nov. 1, 2011  (KR) .................. 10-2011-0112973

(51) Int. Cl.
| | | |
|---|---|---|
| C08L 75/04 | (2006.01) |
| C08G 18/48 | (2006.01) |
| C08G 18/63 | (2006.01) |
| C08G 18/66 | (2006.01) |
| C08G 18/72 | (2006.01) |
| C08G 18/76 | (2006.01) |
| C08G 18/79 | (2006.01) |
| C08G 18/32 | (2006.01) |
| C08G 18/40 | (2006.01) |
| C08G 101/00 | (2006.01) |

(52) U.S. Cl.
CPC .......... *C08G 18/4837* (2013.01); *C08G 18/632* (2013.01); *C08G 18/6688* (2013.01); *C08G 18/725* (2013.01); *C08G 18/7621* (2013.01); *C08G 18/7664* (2013.01); *C08G 18/797* (2013.01); *C08G 18/3206* (2013.01); *C08G 18/3275* (2013.01); *C08G 18/3281* (2013.01); *C08G 18/4072* (2013.01); *C08G 2101/0083* (2013.01); *C08G 2350/00* (2013.01)
USPC .......................................... 521/164

(58) Field of Classification Search
CPC ........... C08G 18/7671; C08G 18/7664; C08G 18/7621
USPC .......................................... 521/164
See application file for complete search history.

(56) References Cited

U.S. PATENT DOCUMENTS 5,246,977 A * 9/1993 Mussini ................. 521/159

FOREIGN PATENT DOCUMENTS

| JP | 2005206780 A | 8/2005 |
|---|---|---|
| JP | 2006328202 A | 12/2006 |
| JP | 2009084321 A | 4/2009 |
| KR | 10-2008-0017319 | 2/2008 |
| KR | 10-2008-0018171 | 2/2008 |
| KR | 10-0936319 | 6/2009 |
| WO | WO 2006126609 A1 * | 11/2006 |

* cited by examiner

*Primary Examiner* — Mike M Dollinger
(74) *Attorney, Agent, or Firm* — Edwards Wildman Palmer LLP; Peter F. Corless

(57) ABSTRACT

Disclosed is a polyurethane composition including a polyol, a polyisocyanate, a curing catalyst, a crosslinking agent, a foam stabilizer and a blowing agent. The polyurethane composition may be used to manufacture automotive components, and in particular, an automotive seat. An automotive seat manufactured with the disclosed composition provides increased comfort to an occupant, as well as increased reduction of road vibration, thereby improving overall ride comfort.

13 Claims, No Drawings

POLYURETHANE COMPOSITIONS FOR AN AUTOMOTIVE SEAT

CROSS-REFERENCE TO RELATED APPLICATIONS

This application claims priority under 35 U.S.C. §119 to Korean Patent Application No. 10-2011-0112973, filed on Nov. 1, 2011, in the Korean Intellectual Property Office, the disclosure of which is incorporated herein by reference in its entirety.

BACKGROUND (a) Technical Field

The present invention relates to polyurethane compositions for use in manufacturing automobile components. More particularly, the present invention relates to polyurethane foam compositions including a modified methylene diphenyl isocyanate (MDI) and a polyol having a molecular weight of about 3000 to 7000, for use in manufacturing a car seat that provides improved comfort and vibration absorption.

(b) Background Art

People spend more time in their cars than ever before; therefore, there is a need for an automotive seat that provides increased comfort during frequent use, or for extended use over long periods of time. In the conventional art, automotive seats are typically manufactured using a polyurethane foam, which is usually prepared by reacting a polyol with an isocyanate. For example, in the conventional art, automotive seats are typically made with a polyurethane foam prepared with a polyol that is mainly a polyether polyol obtained by reacting glycerin with ethylene oxide and propylene oxide. Disadvantageously, automotive seats made with conventional art polyurethane foams fail to provide adequate comfort when used frequently, or for long periods of time.

SUMMARY

The present invention provides a polyurethane foam composition synthesized by reacting a modified methylene diphenyl isocyanate (MDI) and a polyol having a molecular weight of about 3000 to about 7000. Automotive seats manufactured with the polyurethane foam of the invention provide more passenger comfort, and are capable of absorbing more road vibration, than seats made from conventional art polyurethane foams.

In one aspect, the present invention provides a polyurethane composition for improving polyurethane resins and reducing vibrations in order to improve ride comfort.

In another aspect, the present invention provides a polyurethane foam composition including a polyol, a polyisocyanate, a curing catalyst, a crosslinking agent, a foam stabilizer and a blowing agent.

The above and other aspects and features of the present invention will be described infra.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

A polyurethane resin is a soft foam obtained from a polyurethane foam composition including a polyol, a polyisocyanate, a catalyst, a crosslinking agent, a foam stabilizer, and a blowing agent. The polyol has hydroxyl (—OH) functional groups and the polyisocyanate has isocyanate (—NCO) functional groups. In general, polyols can be classified into monols, diols, triols, etc., depending on the number of hydroxyl groups per molecule. Similarly, isocyanates can be classified into monoisocyanates, diisocyanates, etc., depending on the number of the isocyanate groups per molecule.

To prepare a polymeric polyurethane resin, a polyol having two or more functional groups and an isocyanate are generally used. The terminal functional groups of the reactants react with each other to form a urethane group (Scheme 1). A polymer having the urethane group in large quantities in the molecule is called a polyurethane.

R—NCO+R'—OH→[R—NH—COO—R']  [Scheme 1]

Isocyanate reacts with water to form unstable carbamic acid, which is readily decomposed into amine and carbon dioxide ($CO_2$) (Scheme 2). The amine reacts again with isocyanate to form a urea group (Scheme 3), and the carbon dioxide forms gas bubbles in the polyurethane resin, which ultimately results in cells dispersed in polyurethane.

R—NCO+$H_2O$→[R—NH—COOH]→R—$NH_2$+$CO_2$  [Scheme 2]

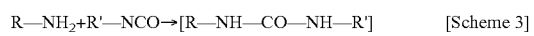

R—$NH_2$+R'—NCO→[R—NH—CO—NH—R']  [Scheme 3]

Polyurethane foam is widely used in automotive parts because of superior properties including low density, high heat resistance, good mechanical properties, etc. It is also widely used in car seats because of its low density and superior durability.

A polyurethane foam composition according to the present invention comprises a polyol and an isocyanate.

Specifically, the polyurethane foam composition according to the present invention comprises about 40 to about 70 parts by weight of an isocyanate based on about 100 parts by weight of a polyol. The contents of the polyol, chain extender, crosslinking agent, water, curing catalyst, blowing catalyst and foam stabilizer according to the present invention are described in Table 1.

TABLE 1

| Components | Contents | Note |
|---|---|---|
| Polyol #1 | 40.0-75.0 wt % | Glycerol, OH—V = 20-40 mg KOH/g |
| Polyol #2 | 10.0-40.0 wt % | Glycerol, OH—V = 20-50 mg KOH/g |
| Polyol #3 | 5.0-30.0 wt % | Glycerol, OH—V = 20-60 mg KOH/g |
| Polyol #4 | 3.0-40.0 wt % | Glycerol, OH—V = 10-30 mg KOH/g, solid 30-50% |
| Chain extender #1 | 1.0-10.0 wt % | Diethanolamine, OH—V = 1500-2500 mg KOH/g |
| Chain extender #2 | 0.1-1.0 wt % | 1,4-Butanediol, OH—V = 500-1500 mg KOH/g |
| Crosslinking agent | 0.1-5.0 wt % | Triethanolamine, OH—V = 1500-2500 mg KOH/g |
| Water | 1.0-5.0 wt % | OH—V = 6000-7000 mg KOH/g |
| Curing catalyst (Dabco 33LV; Air Products, USA) | 0.1-3.0 wt % | 33% triethylenediamine 67% dipropylene glycol |
| Blowing catalyst (Dabco BL-11; Air Products, USA) | 0.1-2.0 wt % | 70% bis(2-dimethylaminoethyl)ether 30% dipropylene glycol |
| Foam stabilizer (Niax-3002; Momentive, USA) | 0.1-3.0 wt % | Polyether-modified polysiloxane |
| Total | 100 wt % | |

Polyols #1-#4

In order to prepare the polyurethane foam, the polyol is used in an amount of at least about 60%. Depending on product characteristics and production conditions, various kinds of polyols may be used. The polyol is produced from a chemical reaction between propylene oxide (PO) and ethylene oxide (EO) in the presence of an initiator.

When glycerol (or glycerin), trimethylolpropane (TMP), triethanolamine (TEOA), 1,2,6-hexanetriol, phosphoric acid and triisopropanolamine are used, a triol having three hydroxyl (—OH) groups (functionality=3) is produced. The hydroxyl value (OH—V) is determined according to the degree of capping with PO/EO, which is related to the molecular weight of the polyol. Polyols having the OH—V in the range of about 20 to about 60 mg KOH/g are used for the preparation of polyurethane foam for car seats. The triol is used in the largest amount in the polyol mixture. Satisfactory flowability, modality and hardness are obtained when the content is at least about 60%. The vibration absorbing ability of the urethane seat foam is greatly dependent on the molecular weight of the polyol.

Polyol #4 is a polyol with a styrene monomer added in solid state. It is used in an amount of about 35 wt % or less since the solid content affects hardness, cell opening properties, and viscosity.

In an exemplary embodiment of the present invention, the content of the polyol is as follows:

Polyol #1 may be used in an amount of about 45.0 to about 75.0 wt %. When the content is less than about 60 wt %, rebounding resilience decreases significantly, and when it is more than about 75 wt %, hardness decreases.

Polyol #2 may be used in an amount of about 10.0 to about 40.0 wt %. When the content is less than about 10 wt %, transmission of vibration increases, and when it is more than about 40 wt %, permanent compression set decreases.

Polyol #3 may be used in an amount of about 5.0 to about 30.0 wt %. When the content is less than 5 wt %, transmission of vibration increases, and when it is more than about 30 wt %, resilience and permanent compression set decreases.

Polyol #4 may be used in an amount of about 3.0 to about 35.0 wt % for a general car seat. When the content is less than about 3 wt %, hardness may be insufficient, and when it is more than about 40 wt %, comfort may decrease due to increased hardness.

Chain Extender and Crosslinking Agent

The product quality requirements cannot be satisfied with the polyol alone. The chain extender and the crosslinking agent should also be included since they affect physical and mechanical properties such as tensile strength, tear resistance, etc. Since use of the chain extender and crosslinking agent leads to increased intermolecular crosslinking, they play an important role in the improvement of physical-mechanical properties such as tensile strength, tear resistance, etc. Furthermore, they may help maintain the product quality under hot and humid conditions by enhancing hydrolysis resistance. However, they may lead to reduced utility because of cell closing and flowability problems. The chain extender #1 (DEOA, OH—V=1500-2500 mg KOH/g) is used in an amount of about 1.0 to about 10 wt %. When the content is less than about 1 wt %, tensile strength and tear resistance decrease, and when it is more than about 10 wt %, utility is reduced rapidly because of excessive cell closing.

The chain extender #2 (1,4-butanediol, OH—V=500-1500 mg KOH/g) is used in an amount of about 0.1 to about 1 wt %. When the content is more than about 1 wt %, flowability decreases.

The crosslinking agent (TEOA) is used in an amount of about 5 wt % or less. When the content is more than about 5 wt %, flowability decreases and thus the defect rate increases.

Curing Catalyst and Blowing Catalyst

The production of polyurethane involves a process whereby two materials in liquid state react with each other to form a solid product. The reaction between the isocyanate and the polyol requires catalysts, i.e. curing catalyst and blowing catalyst, which reduce the energy of activation. Use of the two catalysts allows stable production of polyurethane foam. For the blowing catalyst, triethylamine (TEA) and N,N'-dimethylcyclohexylamine (DMEDA) may typically be used. For the curing catalyst, triethylenediamine (TEDA) or dimethylpiperidine (DMP) may be used. Under most production conditions, a demolding time is required. To finish the production within the limited time range, the amine-based curing catalyst is used in an amount of about 3 wt % or less and the blowing catalyst is used in an amount of about 2 wt % or less.

The curing catalyst and the blowing catalyst may be used in an amount of about 0.1 to about 3.0 wt % and about 0.1 to about 2.0 wt %, respectively. When they are used in smaller amounts, utility may decrease due to reduced curability. And, when they are used in larger amounts, defects may occur due to decreased flowability.

Blowing Agent

Blowing agents are largely classified into physical blowing agents and chemical blowing agents. The blowing agent used in the present invention is a chemical blowing agent. Since the amount of the blowing agent determines the reaction rate, curability and free rise density, it is determined within up to about 5 wt %, depending upon the production conditions utilized. Water may be used for the chemical blowing agent used for a car seat. Methylene chloride (MC) may be used for the physical blowing agent.

In general, the blowing agent is used in an amount of about 1.0 to about 5.0 wt %. When the content is less than about 1.0 wt %, it becomes difficult to achieve the desired density because of insufficient blowing. Alternatively, when the content exceeds about 5.0 wt %, physical properties may be undesirable due to excessive blowing.

Foam Stabilizer

For the foam stabilizer, a silicon-based foam stabilizer (polyether-modified polysiloxane) may be used. It aids in the reaction of methylene diphenyl isocyanate (MDI) with polyol, forms fine foams by reducing surface tension, and stabilizes the fine foams. The foam stabilizer may be used within up to about 3 wt % depending on production conditions.

A general foam stabilizer content is about 0.1 to about 3.0 wt %. When the content is less than about 0.1 wt %, polyurethane foam may not be formed. When it exceeds about 3.0 wt %, utility may decrease because of excessive cell closing.

TABLE 2

| Components | Contents |
|---|---|
| Monomeric MDI (MMDI) | 4.0-70.0 wt % |
| Carbodiimide-modified MDI | 5.0-70.0 wt % |
| Polymeric MDI (PMDI) | 10.0-80.0 wt % |
| TDI | 5.0-80.0 wt % |
| Total | 100 wt % |

The polyisocyanates used in the composition of the present invention and their contents are described in Table 2. In general, monomeric MDI (MMDI), polymeric MDI (PMDI) or toluene diisocyanate (TDI) is used alone or in combination for the polyisocyanate. Since the materials have different hardness, flowability, curability, etc., the desired chemical structure can be ensured by using them in combination. For example, absorption of vibration can be maximized when MMDI, PMDI, carbodiimide-modified MDI and TDI are used in the above ranges.

The MMDI and the carbodiimide-modified MDI are used in an amount of about 4 to about 70 wt %. When the content is less than about 4 wt %, utility may decrease because of excessive cell closing. When it is more than about 70 wt %, the defect rate may increase because of excessive cell opening.

The polymeric MDI is usually used in an amount of about 10.0 to about 80.0 wt %. When the content is less than about 10 wt %, tensile strength and tear resistance decrease rapidly. When it is more than about 90 wt %, hardness increases rapidly.

The TDI is used in an amount of about 5.0 to about 80 wt %. When the content is less than about 5%, rebounding resilience is decreased. And, when it is more than about 80 wt %, transmission of vibration may increase and hardness may decrease.

EXAMPLES

The examples and experiments will now be described. The following examples and experiments are for illustrative purposes only and are not intended to limit the scope of this invention.

Examples 1-3 and Comparative Examples 1-4

Absorption of vibration was evaluated as a measure of ride comfort.

TABLE 3

| | Comp. Ex. 1 | Comp. Ex. 2 | Comp. Ex. 3 | Comp. Ex. 4 | Ex. 1 | Ex. 2 | Ex. 3 |
|---|---|---|---|---|---|---|---|
| Polyol #1 | 80 | 60 | 60 | 60 | 60 | 60 | 65 |
| Polyol #2 | N/A | N/A | 10 | 10 | 20 | 20 | 15 |
| Polyol #3 | N/A | 20 | 10 | 10 | N/A | N/A | N/A |
| Polyol #4 | 20 | 20 | 20 | 20 | 20 | 20 | 20 |
| MDI | 70 | 70 | 70 | 80 | 80 | 70 | 80 |
| TDI | 30 | 30 | 30 | 20 | 20 | 30 | 20 |
| Resilience | 70 | 60 | 65 | 62 | 65 | 67 | 66 |
| Transmission of vibration | 6.5 | 4.8 | 5.2 | 4.2 | 3.2 | 3.9 | 3.5 |
| | Currently used product | Low resilience, permanent compression set | Poor permanent compression set | Poor permanent compression set | | | |

Test Example

Measurement of Physical Properties

For measurement of mechanical properties, the polyurethane foams made according to Comparative Examples 1-4 and Examples 1-3 were prepared into specimens using a high-pressure blowing machine. Physical properties were measured according to ASTM D 3574, and the result is given in Table 2.

Resilience

After dropping a steel ball, the rebound height was measured to evaluate the rebounding resilience of the polyurethane foam.

Transmission of Vibration

Vibration was generated artificially using a vibration generator and transmitted to the polyurethane foam. The absorption of vibration by the polyurethane foam was then measured.

The present invention provides the following advantageous effect.

The polyurethane foam composition according to the present invention is advantageous in that it maximizes the absorption of road vibrations, as well as the comfort to passengers.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A polyurethane foam composition for a car seat comprising a polyol, a polyisocyanate, a curing catalyst, a crosslinking agent, a chain extender, a foam stabilizer and a blowing catalyst, wherein the polyisocyanate comprises about 4 to about 70 wt % of MMDI, about 5 to about 70 wt % of carbodiimide-modified MDI, about 10 to about 80 wt % of PMDI and about 5 to about 80 wt % of TDI.

2. The composition according to claim 1, wherein the polyol is glycerol, trimethylolpropane (TMP), triethanolamine (TEOA), 1,2,6-hexanetriol, phosphoric acid, triisopropanolamine or a mixture thereof.

3. The composition according to claim 1, wherein the polyol has a hydroxyl value (OH-V) of about 10 to about 60 mg KOH/g.

4. The composition according to claim 3, wherein the polyol is selected from the group consisting of a polyol having an OH-V of about 20 to about 40 mg KOH/g, a polyol having an OH-V of about 20 to about 50 mg KOH/g, a polyol having an OH-V of about 20 to about 60 mg KOH/g and a polyol having an OH-V of about 10 to about 30 mg KOH/g.

5. The composition according to claim 4, wherein the polyol comprises about 40 to about 75 wt % of a polyol having an OH-V of about 20 to about 40 mg KOH/g, about 10 to about 40 wt % of a polyol having an OH-V of about 20 to about 50 mg KOH/g, about 5 to about 30 wt % of a polyol having an OH-V of about 20 to about 60 mg KOH/g and about 3 to about 40 wt % of a polyol having an OH-V of about 10 to about 30 mg KOH/g.

6. The composition according to claim 1, wherein the polyisocyanate is in an amount of about 40 to about 70 parts by weight per about 100 parts by weight of the polyol.

7. The composition according to claim 1, wherein the curing catalyst is in an amount of about 0.1 to about 3 parts by weight per about 100 parts by weight of the polyol.

8. The composition according to claim 1, wherein the blowing catalyst is in an amount of about 0.1 to about 2 parts by weight per about 100 parts by weight of the polyol.

9. The composition according to claim 1, wherein the foam stabilizer is in an amount of about 0.1 to about 3 parts by weight per about 100 parts by weight of the polyol.

10. The composition according to claim 1, wherein the crosslinking agent is in an amount of about 0.1 to about 5 parts by weight per about 100 parts by weight of the polyol.

11. The composition according to claim 1, wherein the chain extender is in an amount of about 0.1 to about 2 parts by weight per about 100 parts by weight of the polyol.

12. A polyurethane foam composition comprising:
a polyol, wherein the polyol has a hydroxyl value (OH-V) of about 10 to about 60 mg KOH/g;
a polyisocyanate, wherein the polyisocyanate comprises about 4 to about 70 wt % of MMDI, about 5 to about 70 wt % of carbodiimide-modified MDI, about 10 to about 80 wt % of PMDI and about 5 to about 80 wt % of TDI;
a curing catalyst, wherein the curing catalyst is in an amount of about 0.1 to about 3 parts by weight per about 100 parts by weight of the polyol;
a crosslinking agent, wherein the crosslinking agent is in an amount of about 0.1 to about 5 parts by weight per about 100 parts by weight of the polyol;
a chain extender, wherein the chain extender is in an amount of about 0.1 to about 2 parts by weight per about 100 parts by weight of the polyol;
a foam stabilizer, wherein the foam stabilizer is in an amount of about 0.1 to about 3 parts by weight per about 100 parts by weight of the polyol; and
a blowing catalyst, wherein the blowing catalyst is in an amount of about 0.1 to about 2 parts by weight per about 100 parts by weight of the polyol.

13. A car seat comprising the composition of claim 1.

* * * * *